Oct. 1, 1935.    R. L. WILLIAMS    2,015,702
METHOD AND APPARATUS FOR MEASURING DISTANCES AND DEPTHS
Filed Dec. 13, 1929    2 Sheets-Sheet 1
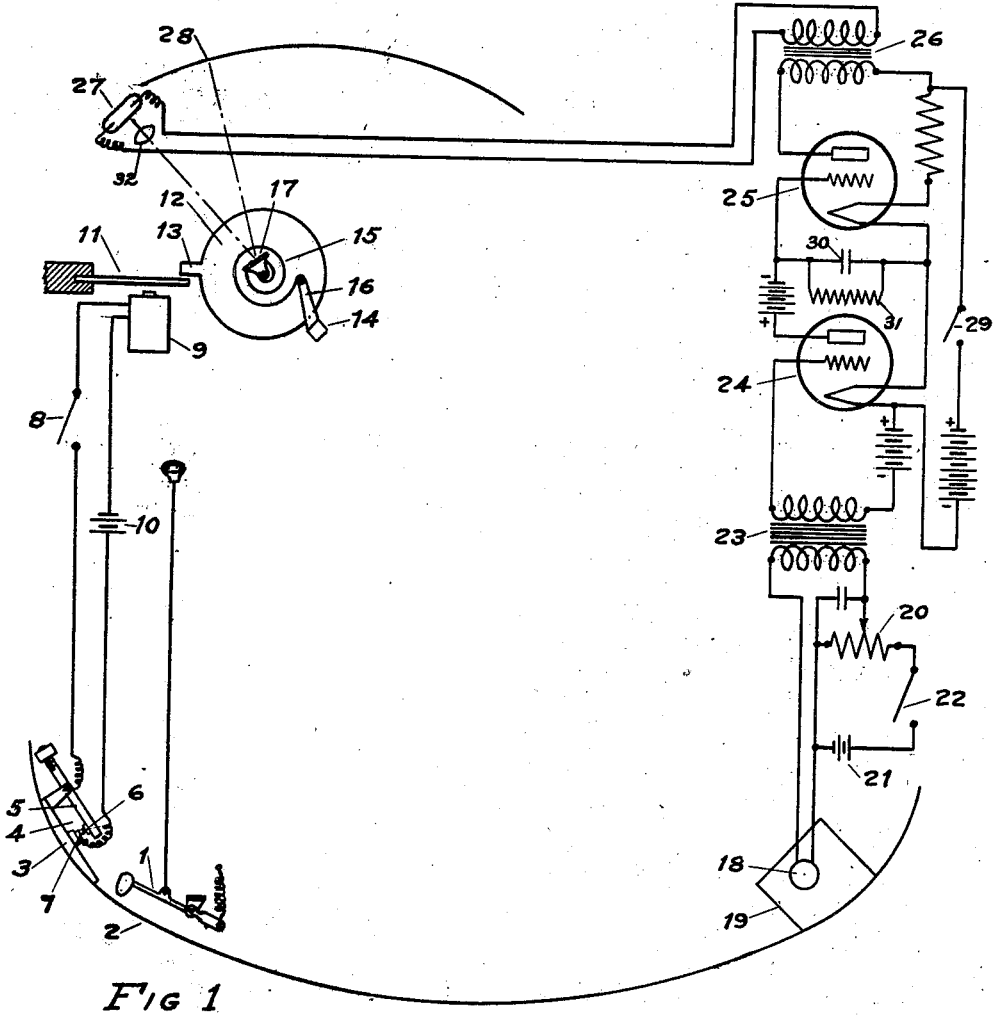
INVENTOR
ROBERT L. WILLIAMS
By
Ezekiel Wolf
ATTORNEY Oct. 1, 1935.  R. L. WILLIAMS  2,015,702
METHOD AND APPARATUS FOR MEASURING DISTANCES AND DEPTHS
Filed Dec. 13, 1929  2 Sheets-Sheet 2
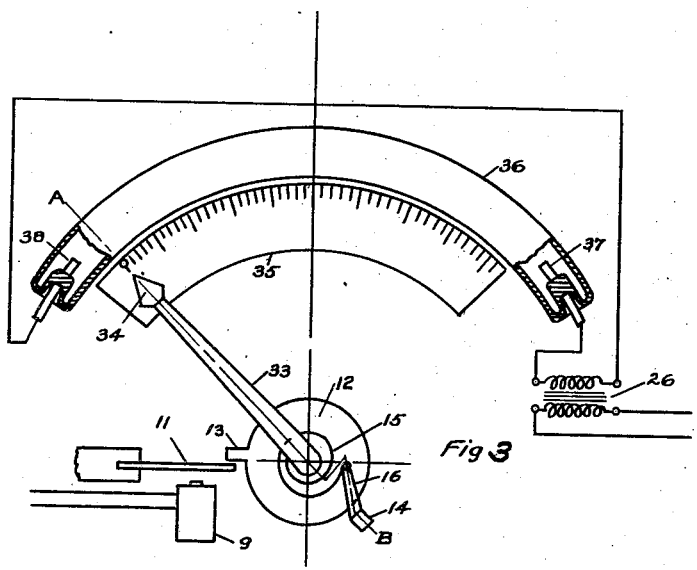
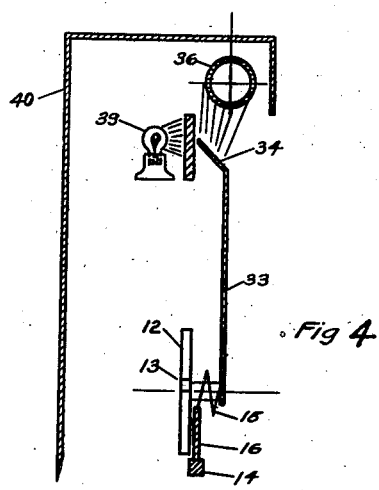
INVENTOR
Robert Longfellow Williams Patented Oct. 1, 1935

2,015,702

UNITED STATES PATENT OFFICE 2,015,702

METHOD AND APPARATUS FOR MEASURING DISTANCES AND DEPTHS

Robert Longfellow Williams, Newton, Mass., assignor to Submarine Signal Company, Boston, Mass., a corporation of Maine Application December 13, 1929, Serial No. 413,917

4 Claims. (Cl. 177—386)

The present invention relates to distance and depth measurement, and more particularly to the system, apparatus and methods employed in determining depths and heights by transmitting a sound or compressional wave signal and measuring the time interval between the emission of the sound and the receipt of the impulse reflected from the object whose distance is to be measured.

Various general types of systems and methods have been employed in measuring depths and distances in the manner above indicated,—some with more or less commercial success. In one system in particular, however, a rotatable indicator is set in motion when the original sound is transmitted and is stopped by a braking mechanism when the echo returns, the angle through which the indicator has rotated being a measure of the distance. Much difficulty has been encountered in effectively stopping the rotating member with the necessary precision when the echo returns. A still greater difficulty is that the braking mechanism has a tendency to act on the initial signal, thereby preventing any motion of the disc, and, of course, preventing a measurement. To avoid this it was found necessary carefully to shield the sound receiver from the direct signal.

The present invention completely eliminates these difficulties.

It has also been found in practice that a sharp sound impulse is well suited to depth sounding. Such an impulse has been produced by an explosion, or by an impact striker such as, for example, is shown in the co-pending application of Edwin E. Turner, Jr., Serial No. 270,660. The use of an explosive for this purpose is attended by a number of objections. The impact strikers employed in the prior art have required a comparatively large source of power for their operation.

The present invention contemplates the use of an impact striker operated by hand- or foot-power, thereby avoiding the disadvantages of the use of an explosive, and also avoiding the necessity for having a large source of power.

A further object of the present invention is to produce a depth sounding system, method and apparatus which will be efficient and accurate in operation, simple and cheap to manufacture.

Additional features of the invention will be disclosed in the description of the drawings, in which Figure 1 shows schematically an arrangement of the system employed in the present invention, Figure 2 shows in elevation a front view of the scale shown in Figure 1, Figure 3 shows a modification of the system shown in Figure 1, and Figure 4 shows in section the apparatus illustrated in Figure 3.

In Figure 1, 1 illustrates a manually operated impact striker which strikes against the ship's skin 2, sending out a sharp sound signal into the water.

The vibrations of the ship's skin caused by the blow of the striker 1 actuate the diaphragm 3 of the hydrophonic relay 4, thereby causing the pivoted arm 5 to move upwards, separating the contacts 6 and 7 which are in series with the switch 8, electromagnet coil 9 and battery 10. The hydrophonic relay schematically shown in the drawings is similar to the apparatus described in my United States Patent No. 1,725,038 granted to me August 20, 1929.

When the switch 8 is closed, the electromagnet 9 is energized by current from the battery 10 through the closed contacts 6 and 7 producing a magnetic pull on spring armature 11. Upon the opening of contacts 6 and 7, the armature is released, thereby setting the inertia disc 12 in rotation. The disc can rotate until the arm 13 strikes stop 14.

To the axis of the disc is attached a coil spring 15 whose other end is fastened to an arm 16 mounted on the stop 14. When the disc rotates by virtue of the energy imparted to it by armature 11, it winds up the spring so that after arm 13 strikes stop 14 the spring returns the disc to its original position. Also mounted upon the disc and rotatable with it is mirror 17 whose function will be described below.

The sound impulse sent into the water by the striker 1 travels to the bottom and after reflection is received by the hydrophone 18 which may be mounted in a tank 19 filled with water. The hydrophone is energized by current from potentiometer 20 and battery 21. A switch 22 is provided to control the hydrophone current.

The sound impulse received by the hydrophone is translated into a corresponding electric impulse which is passed through transformer 23 and to the grid of detector tube 24, thereby producing a negative charge on the grid of tube 25 which cuts off the plate current flowing in the plate circuit of tube 25 through the primary of step-up transformer 26 and consequently induces a high potential in the secondary of the transformer causing a discharge of the indicator, 27. The latter may be any form of indicator which will produce a luminous indication at the time of receipt of the echo, although it is preferred to use an electric discharge tube filled with gas such as neon.

After a negative charge has been placed on the grid of tube 25, resulting in the cutting off of the plate current of that tube, the charge on the grid immediately begins to leak off through resistance 31 shunted by condenser 30, thus restoring the grid to its normal potential, namely that of the negative side of the filament. The plate current flowing through the primary of transformer 26 is thus rapidly built up again, although not so rapidly as it is broken down when the echo is received. The time constant of the grid circuit of tube 25 is determined by the values of resistance 31 and condenser 30. This circuit is described in more detail in the co-pending application of Edwin E. Turner, Jr., Serial No. 200,086.

During the time while the sound impulse has been traveling to the sea bottom and returning to the hydrophone, the inertia disc 12 carrying the mirror 17 has rotated through an angle determined by the depth being measured, the starting force applied by the armature 11 and the retarding force of the spring 15 being regarded as constants. The light emitted by the discharge of the indicator when the echo is received passes through the lens 40 and is reflected from the mirror 17 to a translucent scale 28 which may be graduated directly in terms of depth and is viewed by the observer from the convex side. The scale is shown in elevation in Figure 2.

If the strength of the armature 11, the mass of the disc 12 and the tension of the spring 15 are properly chosen, the rate of angular motion of disc 12 can be made substantially uniform throughout its useful operating sector. Therefore, the angle through which the disc and mirror have moved during the time of travel of the sound impulse will be a measure of the depth. Likewise, the reflection of the luminous indicator at the moment of the receipt of the echo will, if the scale is properly calibrated, fall upon the scale at a point indicating the depth measured.

Instead of determining the instantaneous position of the mirror when the echo is received by causing the mirror to reflect the light beam on a scale, the mirror may be arranged to reflect the light from the neon tube discharge directly to the eye of the observer who will note stroboscopically the instantaneous position of the mirror with respect to a scale when the discharge occurs. This modification of the invention is illustrated in Figures 3 and 4, the latter being a section along the line AB in Figure 3.

In this apparatus, the same type of signal sending and receiving apparatus may be employed as shown in Figure 1. Likewise, an inertia disc 12 is provided which is set in motion by the spring armature 11 when the signal is emitted and rotates against the action of the return spring 15 until the arm 13 strikes stop 14.

Mounted on the disc 12 and rotatable with it is an index 33 which travels in front of a scale 35. The latter may be translucent and illuminated from the rear by a source of light 39 to a sufficient brightness to enable an observer to read the graduations thereon.

Just above and in front of the scale is provided an electric discharge tube 36, which may be filled with a gas such as neon, and whose electrodes 37 and 38 are supplied with a discharge potential from transformer 26 when the echo is received, similarly as in Figure 1. The tube 36, however, is arcuate in shape and extends over the entire length of the scale. When the discharge occurs the light produced is reflected directly to the eye of the observer by a mirror mounted on the bent portion 34 of the index 33. Alternatively the bent portion 34 may be silvered or otherwise adapted to reflect light. The momentary position of the latter will thus appear to the observer as a bright spot of red light, if a neon tube is used, against the scale.

If the direct light from the discharge tube 36 be prevented from reaching the eye of the observer by a shield 40, shown in Figure 4, the index will be substantially invisible except when illuminated by the discharge, thereby producing a remarkably effective indication.

While the system has been described as employing a hand or foot operated striker to send the initial signal, in order to simplify and to reduce the cost of the apparatus, it is of course evident that the indicating and time measuring apparatus described above will operate equally well with any other form of impact striker; e. g., that shown in the co-pending application of Edwin E. Turner, Jr., Serial No. 270,660, when an adequate source of electric power is available.

It will also be apparent to those skilled in the art that other modifications may be made without departing from the spirit and scope of the invention as set forth in the claims.

What is claimed is:

1. In a system for measuring distance or depth according to the echo method in which the time interval is measured between an emitted sound signal and its reflection or echo, the combination of a sound signal producer, a time-measuring device having a movable member, means for setting said member in motion at the beginning of the time interval and prior thereto restraining it from motion including electromagnetic means, and a contact relay positioned to be operated directly by the direct signal impulse and, when operated, to deenergize said electromagnetic means, whereby said member will be released abruptly at the beginning of said time interval.

2. In a system for measuring distance or depth according to the echo method in which the time interval is measured between the emission of a signal impulse and the receipt of its reflection or echo, the combination of a signal emitter, a time-measuring device having a rotatable element, means adapted to impart a rotational velocity to said element, electromagnetic means adapted when energized to restrain said preceding means and a contact relay operatively connected in the energizing circuit of said magnet means to maintain said circuit normally closed and adapted to be operated directly by the direct signal impulse, whereby said velocity imparting means will be released abruptly at the beginning of the time interval.

3. In a system for measuring distance or depth according to the echo method in which the time interval is measured between an emitted sound signal and its reflection or echo, the combination of a sound wave producer, a time-measuring device having an inertia disc, spring means adapted when tensioned and released to impart a rotational velocity to said disc, and electromagnetic means for initially holding said spring means under tension, and means for releasing said spring means at the beginning of the time interval including a contact relay adapted to be operated directly by the direct sound wave and having its contacts connected in series with the magnet energizing circuit whereby the direct wave effects an abrupt deenergization of said magnet and a consequent abrupt commencement of the motion of said disc.

4. In a system for measuring distances or depths on board ship according to the echo method in which the time interval is measured between the emission of a sound signal impulse and the receipt of its reflection or echo, the combination of a sound signal emitter adapted to strike the skin of the ship, a time-measuring device having a rotatable element, means adapted to impart a rotational velocity to said element, electromagnetic means adapted when energized to restrain said velocity imparting means and a sound wave responsive contact relay mounted upon the skin of the ship in acoustically operative relation thereto and having a pair of contacts operatively connected to the energizing circuit of said magnetic means.

ROBERT LONGFELLOW WILLIAMS.